United States Patent [19]

Holman, Jr.

[11] 4,083,312

[45] Apr. 11, 1978

[54] LOAD HOLDER END FITTING

[76] Inventor: Robert E. Holman, Jr., 11400 E. Ricks Cir., Dallas, Tex. 75230

[21] Appl. No.: 740,206

[22] Filed: Nov. 8, 1976

[51] Int. Cl.² ............................ A44B 17/00; B60P 7/10
[52] U.S. Cl. ....................................... 105/469; 24/215; 105/481; 105/485
[58] Field of Search ............... 105/469, 476, 477, 479, 105/481, 485; 280/179 R, 179 A; 24/201 A, 213 C, 215; 16/125, 126; 248/72, 73, 302, 317, 119 R, 499

[56] References Cited

U.S. PATENT DOCUMENTS

| | | | |
|---|---|---|---|
| 3,261,053 | 7/1966 | Lesher | 16/126 |
| 3,713,191 | 1/1973 | Hofmann | 24/201 A |
| 3,837,048 | 9/1974 | Lewis et al. | 24/201 A |

*Primary Examiner*—Robert G. Sheridan
*Attorney, Agent, or Firm*—Clarence A. O'Brien; Harvey B. Jacobson

[57] ABSTRACT

A pair of elongated anchor members are provided and extend along opposing walls of a load bed interconnected by means of a third wall extending therebetween. The anchor members have apertures formed therein spaced therealong and a load holding strap assembly is provided including an adjustable length main section and a pair of opposite end sections. Each end section comprises a generally U-shaped body constructed of stiff spring-type material and having a pair of generally parallel legs interconnected at one pair of corresponding ends by means of an integral bight portion extending therebetween. The other pair of the legs of each body include oppositely outwardly directed terminal ends and the bight portion is anchored to the corresponding end of the main section for oscillation relative thereto about an axis substantially coinciding with the center axis of the bight portion. The free ends of the legs of each U-shaped body are removably inserted through a selected aperture formed in a corresponding anchor member with the laterally directed terminal ends thereof engaged behind the surface of the anchor member remote from the other anchor member and on remote sides of the corresponding aperture.

2 Claims, 5 Drawing Figures

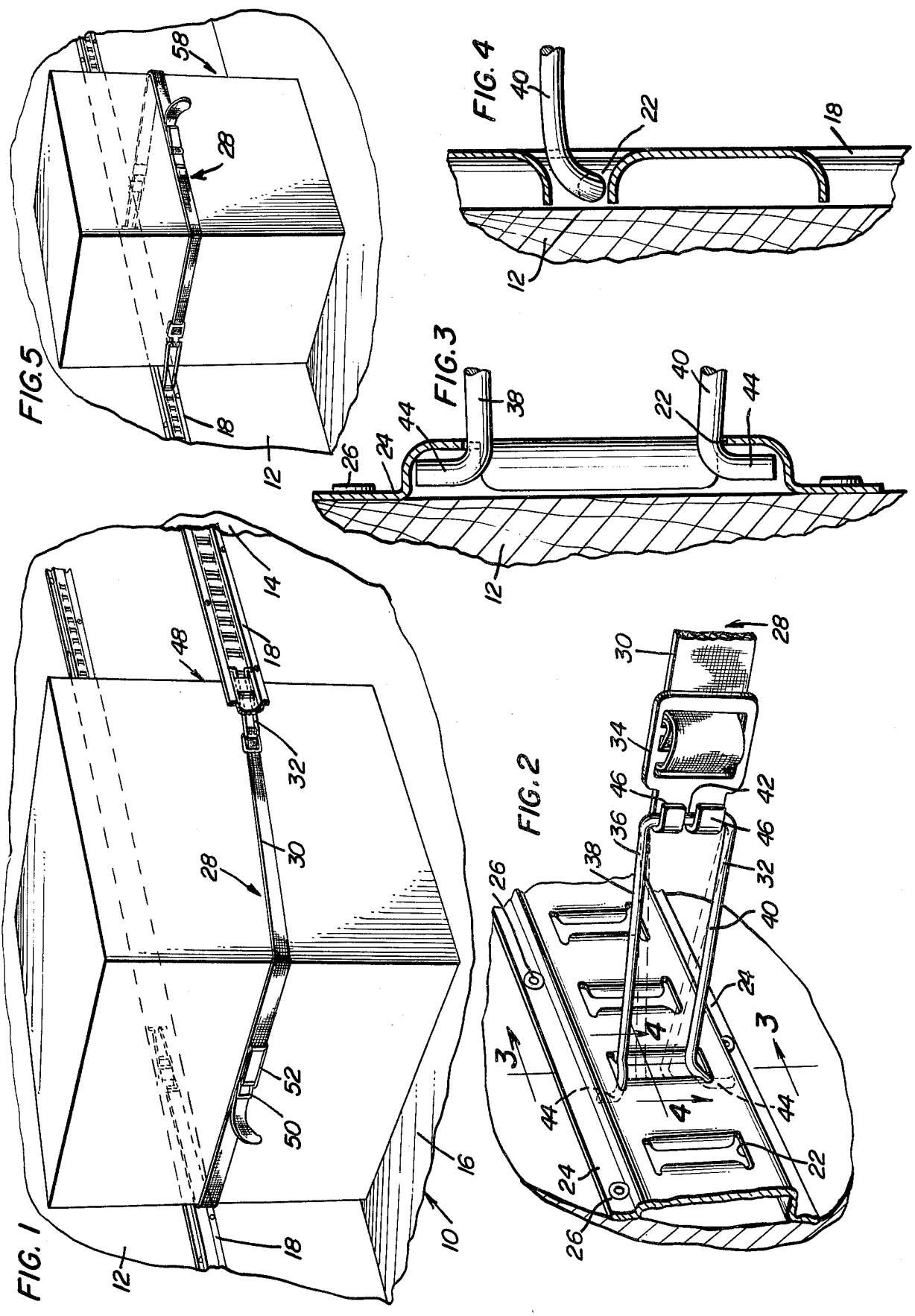

LOAD HOLDER END FITTING

BACKGROUND OF THE INVENTION

Load beds are conventionally provided with at least one pair of opposing walls interconnected by means of a third wall extending therebetween usually comprising a flooring upon which loads are to be placed. If the load bed comprises a part of a mobile carrier, the loads supported on the floor are subject to shifting. Accordingly, the opposing side walls of the load bed are conventionally provided with anchor points spaced therealong and retaining straps, lines or cables may be secured between anchor points on the opposing side walls in order to retain a load positioned on the floor against shifting.

However, in many instances, and particularly when the carrier is to make many stops for loading articles on to the load bed and unloading articles from the load bed, it becomes a time consuming task to resecure the load within the load bed after each unloading of articles therefrom or loading of articles thereonto with the result that persons handling the loading and unloading often do not adequately secure a load against shifting. This time consuming task is in part due to the repeated necessity of having to unsecure and secure the ends of a load retaining strap or cable in proper positions on the side walls of the load bed.

Accordingly, a need exists for structure whereby an adjustable length load retaining strap or other tension member may be provided and its opposite ends may be readily releasably anchored to predetermined anchor points spaced along side walls of a load bed.

BRIEF DESCRIPTION OF THE INVENTION

The instant invention includes a pair of elongated anchor members provided for securement along the opposite side walls of a load and with each anchor member provided with longitudinally spaced apertures. An elongated load retaining strap is also provided and includes a main center portion which is readily adjustable in length and opposite end portions including anchor structures which may be readily releasably engaged with selected aperture portions of the corresponding anchor members.

The main object of this invention is to provide an assembly whereby a load within a load bed may be readily anchored against shifting therein.

Another object of this invention, in accordance with the immediately preceding, is to provide an elongated load anchoring strap member or other tension member including opposite terminal ends constructed in a manner whereby they may be readily releasably anchored to predetermined anchor portions spaced along the opposite side walls of a load bed.

A final object of this invention to be specifically enumerated herein is to provide a load holding apparatus in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

FIG. 1 is a fragmentary perspective view of the interior of a mobile load carrier with the load holding apparatus of the instant invention in operative association with the side walls of the load bed and a load supported on the flooring of the load bed;

FIG. 2 is a fragmentary perspective view illustrating the manner in which one of the terminal ends of the load holding strap may be releasably anchored to one of the side wall mounted anchor members of the invention;

FIG. 3 is an enlarged fragmentary vertical sectional view taken substantially upon the plane indicated by the section line 3—3 of FIG. 2;

FIG. 4 is an enlarged fragmentary horizontal sectional view taken substantially upon the plane indicated by the section line 4—4 of FIG. 2; and FIG. 5 is a fragmentary perspective view illustrating an alternate manner of utilizing the load holder of the instant invention.

DESCRIPTION OF THE PREFERRED EMBODIMENT

Referring now more specifically to the drawings, the numeral 10 generally designates a load bed of a mobile vehicle including a first pair of opposing side walls 12 and 14 interconnected by means of a third wall or floor 16 extending therebetween. The side walls 12 and 14 have elongated anchor members 18 secured thereto and extending therealong. Each of the anchor member 18 comprises a channel member opening toward the corresponding side wall and having a plurality of vertically elongated apertures 22 formed in its bight portion and spaced longitudinally therealong. The anchor members 18 include opposite side co-planar mounting flange portions 24 which are secured to the corresponding side walls 12 and 14 by means of suitable fasteners 26.

An elongated load holding strap assembly is referred to in general by the reference numeral 28 and includes an adjustable length main section 30 and a pair of opposite end sections 32. From FIG. 2 of the drawings it may be seen that each end of the main section 30 includes a buckle 34 anchored thereto.

Each opposite end section 32 comprises a generally U-shaped body 36 constructed of stiff spring-type rod material and including a pair of generally parallel legs 38 and 40 interconnected at one pair of corresponding ends by means of an integral bight portion 42 each of the legs 38 and 40 being more than twice the length of the bight portion 42, whereby only slight flexure of the rod material at the intersections of the legs with the bight portion 42 is required to effect sufficient displacement of the terminal ends 44 toward each other to enable disengagement of the ends 44 from the anchor member 18. The other pair of ends of each pair of legs 38 and 40 include oppositely right angularly directed terminal ends 44 for purpose to be hereinafter more fully set forth.

Each buckle 34 includes a pair of reversely bent ears 46 and the corresponding bight portion 42 is anchored to the buckle 34 by means of the ears 46 being hooked about opposite end portions of the bight portion 42 and captively retaining the latter in engagement with the buckle 34. In addition, the reversely bent ears oscillatably receive the bight portions 42 for angular displacement of the latter about their longitudinal center axes relative to the corresponding buckles 34.

After a load such as the load referred to in general by the reference numeral 48 in FIG. 1 is placed in position on the floor 16, the load holding strap assembly 28 has its opposite end sections 32 releasably engaged with the anchor members 18 in a manner which is believed to be obvious from FIG. 2 of the drawings. The free ends of the legs 38 and 40 are urged toward each other so as to reduce the spacing between the corresponding terminal ends 44 after which the latter may be inserted through a selected aperture 22 and the legs 38 and 40 may be released so as to spring to their spread apart positions illustrated in solid lines in FIG. 2 with the free ends thereof engaged behind those portions of the anchor members defining remote marginal portions of the corresponding apertures 22. After the end sections 32 have been engaged with selected apertures 22 formed in the anchor members 18, the main section 30 may be adjusted in length through the utilization of the buckle 50 in the center thereof and the overcenter toggle assembly 52 of the main section 30 may be actuated to tension the latter in order that the load 48 may be retained against shifting.

If it is desired, the load holding strap assembly 28 may be utilized in conjunction with only one of the anchor members 18 in the manner illustrated in FIG. 5 of the drawings, whereupon a load referred to in general by the reference numeral 58 is retained against the side wall 12 by means of a single load holding strap assembly 28 whose opposite ends are engaged with longitudinally spaced portions of the corresponding anchor member 18.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a load bed including a pair of opposing load retaining walls interconnected by means of a third wall extending therebetween, a pair of elongated anchor members supported from and extending along said pair of walls, said anchor members have apertures formed therein spaced therealong, a load holding strap assembly, said strap assembly including an adjustable length main section and a pair of opposite end sections, each of said end sections including a generally U-shaped body constructed of stiff spring-type rod material and having a pair of generally parallel substantially straight legs interconnected at one pair of corresponding ends by means of an integral bight portion extending therebetween, said legs each being more than twice the length of said bight portion, the other pair of free ends of the legs of said U-shaped body terminating in oppositely outwardly directed terminal ends defining free ends of substantially L-shaped configuration at the free end portions of the legs, said bight portions being anchored to the opposite ends of said main section, said other pairs of ends of said legs being projected through selected apertures in said anchor members with said terminal ends of each pair of legs engaged behind the surfaces of the corresponding anchor members remote from the other anchor member and on remote sides of the corresponding apertures, said body being tensioned to yieldingly bias said other pairs of ends of said legs of each U-shaped body away from each other into tight frictional engagement with the portions of said anchor members defining said corresponding apertures.

2. The combination of claim 1 wherein said bight portions and main section include coacting means anchoring said bight portions to said opposite ends of said main section for oscillation of said bodies about axes extending transversely of said main section and substantially coinciding with the center axes of said bight portion.